United States Patent
Peters et al.

(10) Patent No.: US 10,647,516 B2
(45) Date of Patent: May 12, 2020

(54) COGGED FEEDERHOUSE FRONT DRUM

(71) Applicant: Deere & Company, Moline, IL (US)

(72) Inventors: David W. Peters, Bettendorf, IA (US);
Corwin M. Puryk, Bettendorf, IA (US); Volker Fuchs, Bettendorf, IA (US); Mark L. Mattson, Erie, IL (US); Christopher J. Faulkner, Eldridge, IA (US); Martin Rittershofer, East Moline, IL (US)

(73) Assignee: DEERE & COMPANY, Moline, IL (US)

( * ) Notice: Subject to any disclaimer, the term of this patent is extended or adjusted under 35 U.S.C. 154(b) by 111 days.

(21) Appl. No.: 15/476,508

(22) Filed: Mar. 31, 2017

(65) Prior Publication Data

US 2018/0279554 A1    Oct. 4, 2018

(51) Int. Cl.
| | |
|---|---|
| *B65G 23/06* | (2006.01) |
| *B65G 15/52* | (2006.01) |
| *A01D 61/00* | (2006.01) |
| *A01D 61/02* | (2006.01) |
| *A01F 12/10* | (2006.01) |

(52) U.S. Cl.
CPC .......... *B65G 23/06* (2013.01); *A01D 61/008* (2013.01); *A01D 61/02* (2013.01); *A01F 12/10* (2013.01); *B65G 15/52* (2013.01)

(58) Field of Classification Search
CPC ...... A01D 41/16; A01D 61/008; A01D 61/02; A01F 12/10; A01F 12/16; B65G 23/04; B65G 23/06; B65G 15/52
See application file for complete search history.

(56) References Cited

U.S. PATENT DOCUMENTS

| | | | | |
|---|---|---|---|---|
| 3,015,381 A | * | 1/1962 | Mohwinkel | A01D 17/10 198/834 |
| 3,976,192 A | * | 8/1976 | Muller | B65G 15/52 198/835 |
| 4,271,660 A | | 6/1981 | Kloefkom et al. | |
| 4,589,543 A | * | 5/1986 | Hastem-Muller | B65G 23/06 198/699 |
| 4,724,909 A | * | 2/1988 | Link | A01D 17/10 171/126 |
| 4,899,868 A | | 2/1990 | Johnson | |
| 5,076,418 A | | 12/1991 | Tanis | |
| 5,234,097 A | * | 8/1993 | Okuyama | B29D 30/3007 198/434 |

(Continued)

FOREIGN PATENT DOCUMENTS

| | | |
|---|---|---|
| DE | 102009036104 A1 | 2/2011 |
| DE | 102013226436 A1 | 6/2015 |
| FR | 2196280 A1 * | 3/1974 ........... B65G 17/067 |

OTHER PUBLICATIONS

Search Report issued in counterpart application No. EP18164609.2, dated Aug. 23, 2018 (7 pages).

*Primary Examiner* — Alicia Torres
(74) *Attorney, Agent, or Firm* — Michael Best & Friedrich LLP

(57) ABSTRACT

A conveyor drum (202) for an endless belt conveyor (200) for a feederhouse of an agricultural combine (104) includes an elongate drum (202), cogs (213) fixed to the drum for driving endless belts (210), and retainers (218) fixed to the drum (202) to maintain the endless belts (210) in a proper operating position.

14 Claims, 10 Drawing Sheets

(56) References Cited

U.S. PATENT DOCUMENTS

| | | | | |
|---|---|---|---|---|
| 5,320,214 | A | * | 6/1994 | Kordis ................ B65G 15/64 198/750.1 |
| 5,470,293 | A | * | 11/1995 | Schonenberger ...... A63B 22/02 198/834 |
| 5,478,277 | A | * | 12/1995 | Kloefkorn ............ A01D 61/008 460/114 |
| 5,507,382 | A | | 4/1996 | Hartwell et al. |
| 5,724,909 | A | * | 3/1998 | Pitman ..................... F21K 2/00 116/202 |
| 6,196,916 | B1 | | 3/2001 | Childs |
| 6,368,209 | B2 | | 4/2002 | Moster et al. |
| 7,131,532 | B2 | * | 11/2006 | Webster ................ B65G 15/52 198/867.15 |
| 8,188,384 | B2 | * | 5/2012 | Verhaar ............... G01G 11/003 177/119 |
| 8,267,823 | B2 | * | 9/2012 | Monti ................... B65G 23/06 474/141 |
| 9,327,907 | B1 | * | 5/2016 | Schiltz .................. B65G 39/07 |
| 9,717,182 | B2 | * | 8/2017 | Rittershofer ........... A01F 12/10 |
| 2002/0134651 | A1 | * | 9/2002 | Itoh ....................... B65G 15/64 198/835 |
| 2004/0089519 | A1 | * | 5/2004 | Pollak ................... B65G 15/64 198/834 |
| 2015/0173298 | A1 | | 6/2015 | Jager |
| 2016/0007538 | A1 | * | 1/2016 | Fuchs .................... A01F 12/46 460/114 |
| 2017/0251606 | A1 | * | 9/2017 | Van Overschelde ... A01F 12/10 |

* cited by examiner

COGGED FEEDERHOUSE FRONT DRUM

FIELD OF THE INVENTION

This invention relates generally to agricultural combines. More particularly it relates to feederhouses for agricultural harvesting heads mounted on agricultural combines. Even more particularly, it relates to feederhouse conveyors.

BACKGROUND OF THE INVENTION

Agricultural harvesters, such as agricultural combines, are designed to travel through agricultural fields harvesting crops. Agricultural combines receive crop severed from the ground and convey it to threshing, separating and cleaning devices within the agricultural combine.

In a typical arrangement, the agricultural harvesting head severs the crop from the ground and conveys it to the central region of the harvesting head. It is then conveyed rearward into a central and forwardly opening aperture in the front of the agricultural combine proper.

The cut crop material is carried from the agricultural harvesting head to the agricultural combine through a feederhouse. The feederhouse includes an internal conveyor that draws the material rearward and upward from the harvesting head (close to the ground) to an aperture on the front of the combine which is higher.

Feederhouse conveyors are traditionally constructed of front and rear shafts to which narrow sprockets are fixed. Two endless chain loops are mounted on the sprockets. The chains have links that wrap around all four sides of the sprocket teeth and are coupled together with pivoting connections disposed at the end of each link. Slats are fixed at each end to these chain loops to convey the cut crop material.

There are problems with this arrangement. They are noisy. They are prone to wear due to the metal on metal contact and continuous flexing of the chain loops. Further, cut crop material is prone to wrap around the narrow shafts on which the sprockets are mounted.

What is needed is an improved feederhouse conveyor arrangement. It is an object of this invention to provide such an arrangement, and particularly an improved front conveyor drum.

SUMMARY OF THE INVENTION

In accordance with a first aspect of the invention a front conveyor drum having a longitudinal axis for an endless belt conveyor for a feederhouse of an agricultural combine is provided, wherein the endless belt conveyor comprises two endless and spaced-apart elastomer embedded fabric belts that are driven by drive wheels located at the rear of the feederhouse, and that extend around the front drum conveyor in spaced-apart relation, the front conveyor drum comprising: an elongate hollow drum configured to rotate around the longitudinal axis; a plurality of cogs fixed to the surface of the drum; and belt retainers fixed to the drum to maintain the belts in a proper operating position on the drum.

The plurality of cogs may be configured to engage and be driven by mating cogs extending inwardly from an inner surface of the belts.

The plurality of cogs may comprise a first ring of cogs fixed to the surface of the drum on one side of the drum, and a second ring of cogs fixed to the surface of the drum on other side of the drum.

The cogs in the first ring may be spaced equidistantly apart, and the cogs in the second ring may be spaced equidistantly apart.

Each cog of the plurality of cogs may have a cog length in the direction of the longitudinal axis that is greater than a cog width in a direction parallel to the direction of rotation of the drum.

The cog length may be at least three times as large as the cog width.

The cog length may be at least four times as large as the cog width.

The plurality of cogs may be semicircular in a cross-section that is taken perpendicular to the longitudinal axis.

The height of each cog of the plurality of cogs above the outer surface of the drum may be substantially the same as the height of the mating cogs.

The retainers may comprise retaining rings.

The retaining rings may be fixed to the outer surface of the drum and may extend completely about the drum.

A first retaining ring of the retaining rings may be fixed to the outer surface of the drum adjacent to a first ring of the plurality of cogs, and a second retaining ring of the retaining rings may be fixed to the outer surface of the drum adjacent to a second ring of the plurality of cogs.

The first retaining ring may be disposed on the drum to abut one side of a first one of the belts, and the second retaining ring may be disposed on the drum to abut one side of a second one of the belts.

The plurality of cogs may be fixed to the drum at the same radial distance from the longitudinal axis that the belt retainers are fixed to the drum.

DETAILED DESCRIPTION OF THE PREFERRED EMBODIMENTS

Figure 1:
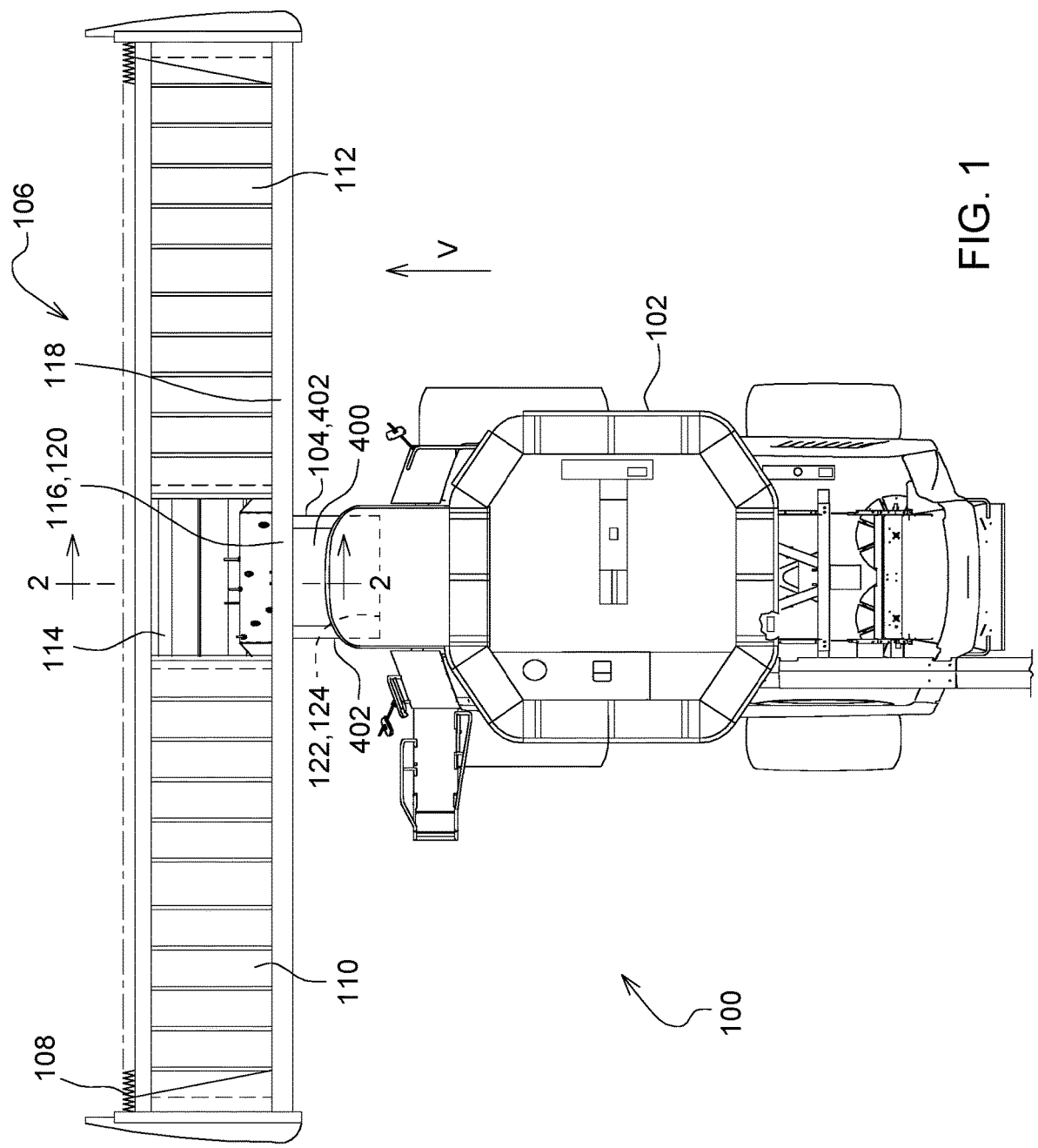
FIG. 1 illustrates an agricultural harvester in plan view in accordance with the present invention.

In FIG. 1, an agricultural harvester 100 comprises an agricultural combine 102 having a feederhouse 104 extending from the front of the agricultural combine 102, and an agricultural harvesting head 106 supported on forward end of the feederhouse 104. The agricultural harvester 100 travels in a direction of travel "V" through the field to harvest crop.

Crop plants are severed by reciprocating knife 108 that extends across the width of the agricultural harvesting head 106. The cut crop material falls backward on to a left side conveyor 110, right side conveyor 112, and a center conveyor 114.

The left side conveyor 110 carries cut crop material to the right and deposits it on the center conveyor 114. The right side conveyor 112 carries cut crop material to the left and deposits it on the center conveyor 114.

The center conveyor 114 carries cut crop material rearward through a large aperture 116 in the rear wall 118 of the agricultural harvesting head 106.

The cut crop material passing through the aperture 116 is in the form of a thick mat. This thick mat of cut crop material is conveyed into a front opening 120 of the feederhouse 104. A conveyor inside the feederhouse 104 carries the cut crop material rearward and upward, through a rear opening 122 and into a corresponding front opening 124 in the agricultural combine 102 itself.

The large aperture 116 is aligned with and is substantially the same size as the front opening 120 of the feederhouse 104. The rear opening 122 of the feederhouse 104 is aligned with and is substantially the same size as the front opening 124 of the agricultural combine 102. All the apertures and openings are of sufficient size to carry all the cut crop material from the agricultural harvesting head 106 into the agricultural combine 102.

Cogged Drum

Figure 2:
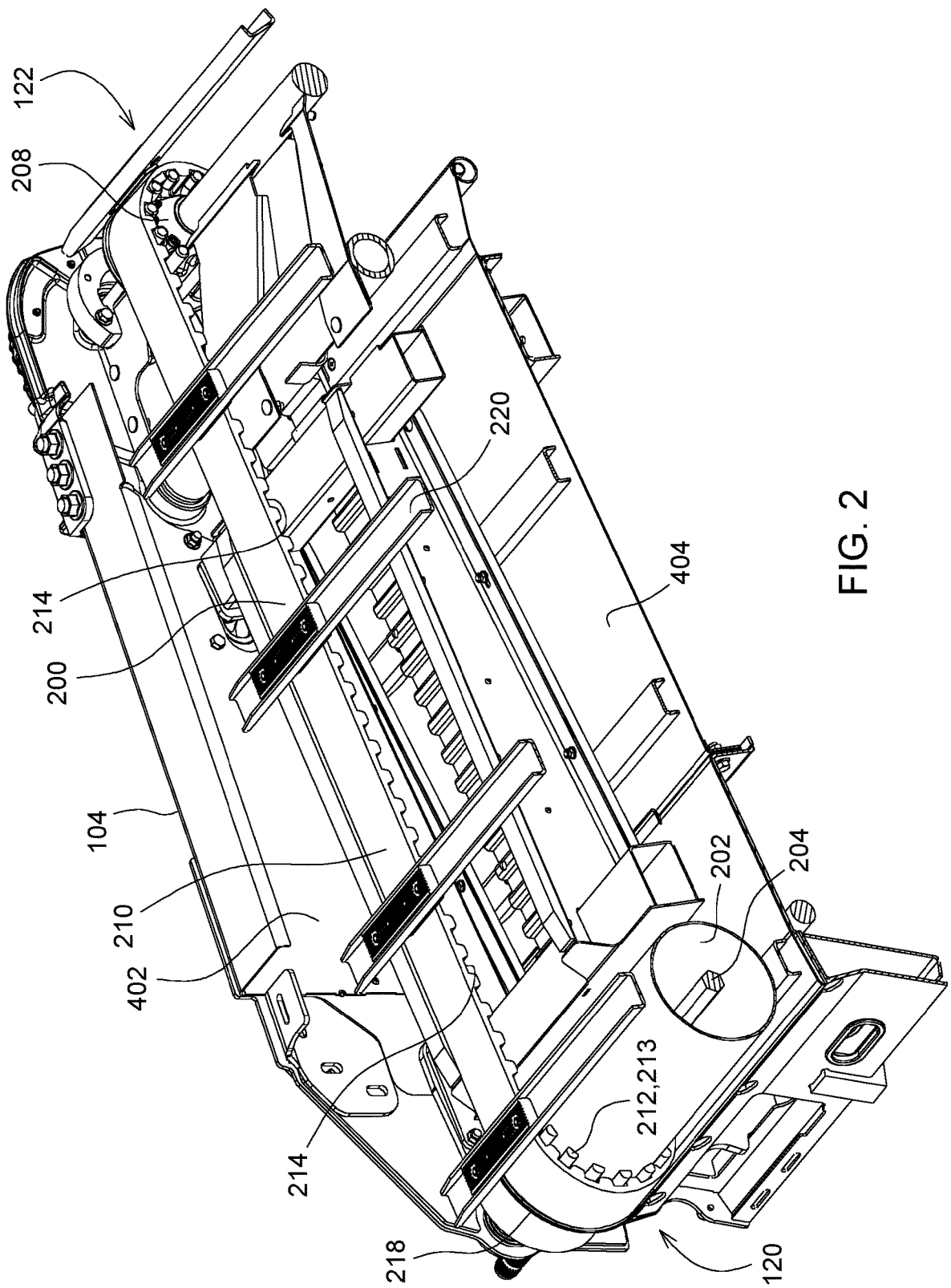
FIG. 2 is a cross-sectional perspective view taken at section line 2-2 in FIG. 1.
Figure 3:
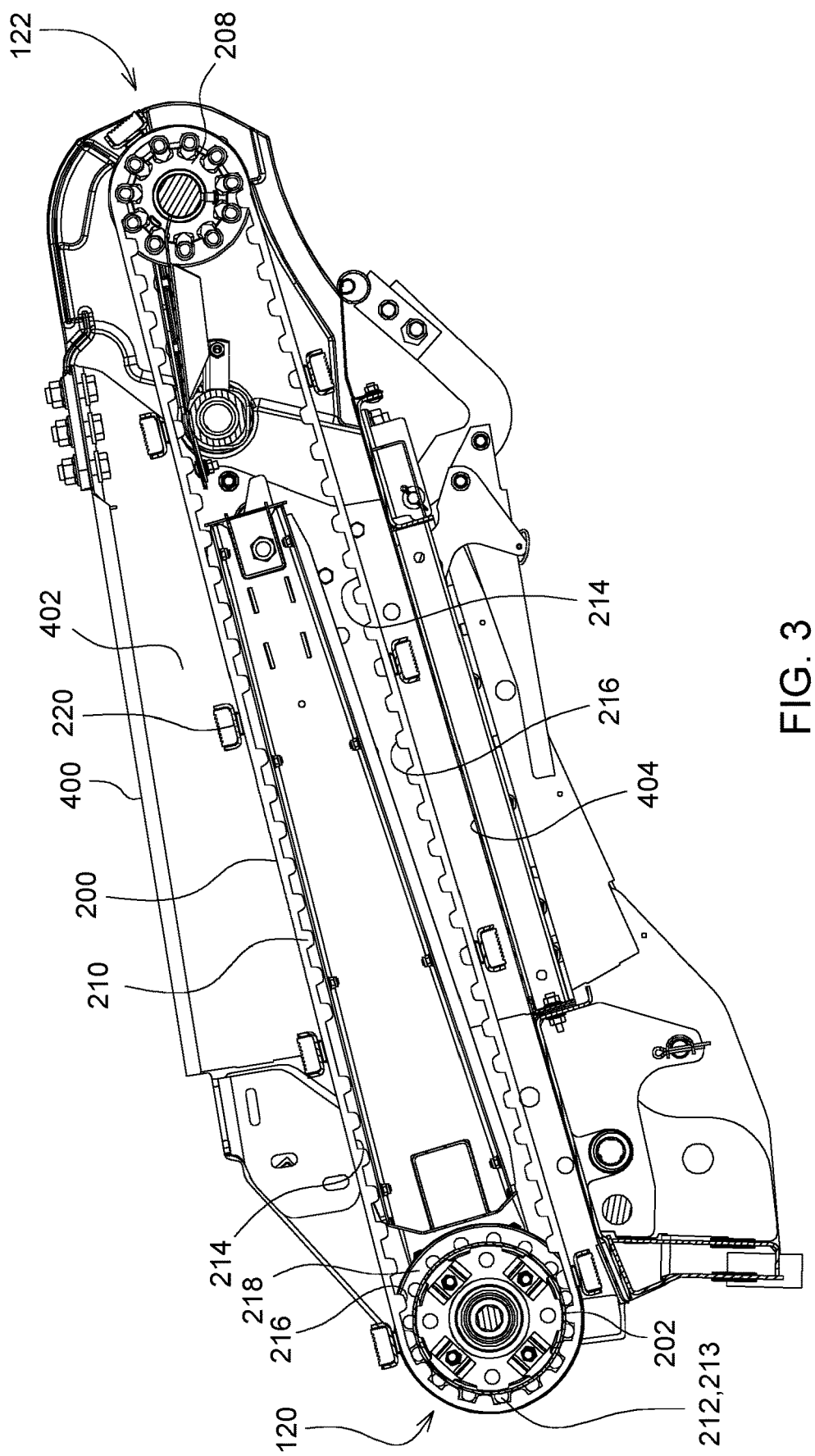
FIG. 3 is a side view of the endless belt and cog drive arrangement.
Figure 4:
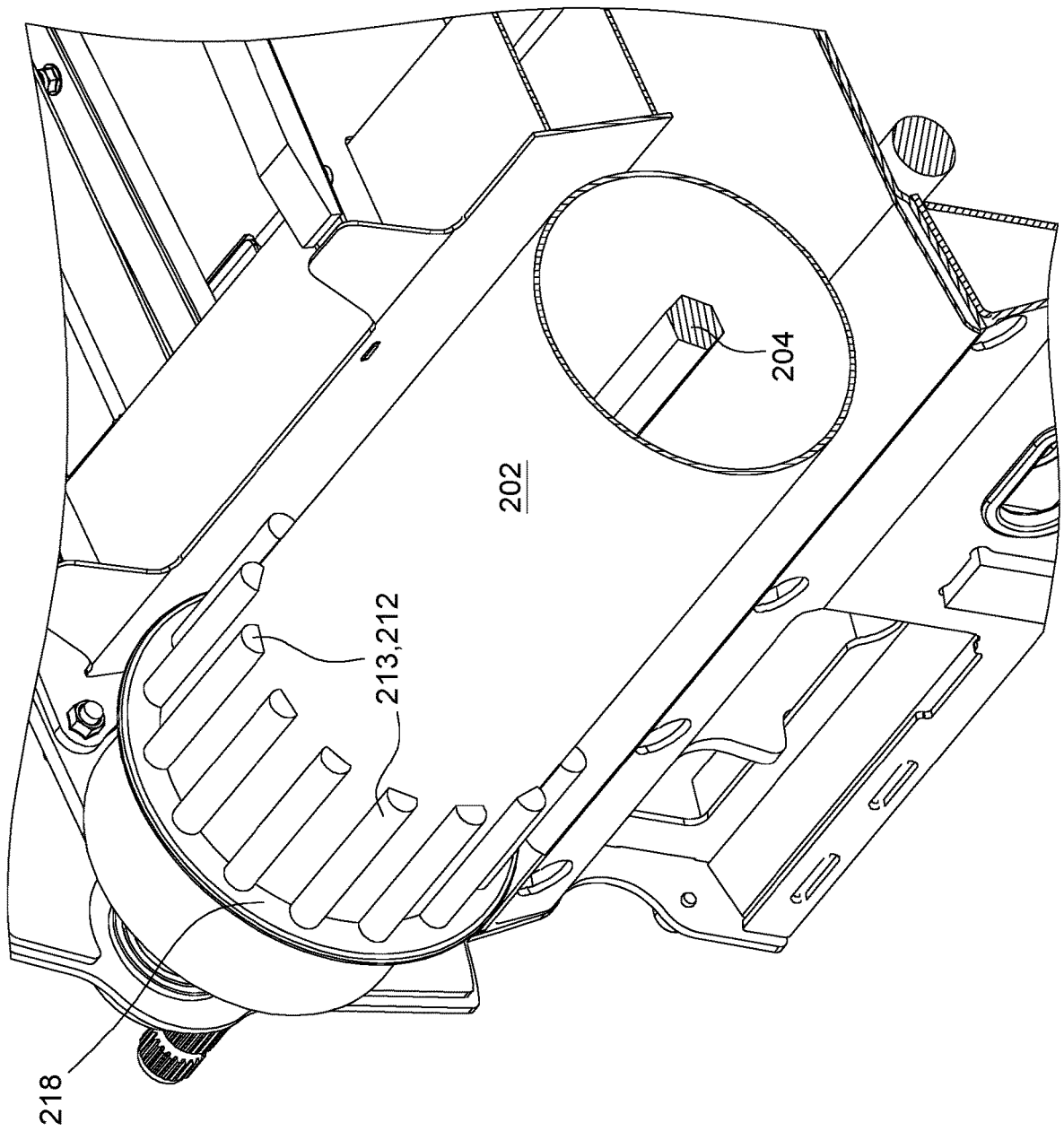
FIG. 4 is a detail perspective view of the cogged drum of FIGS. 2-3.
Figure 5:
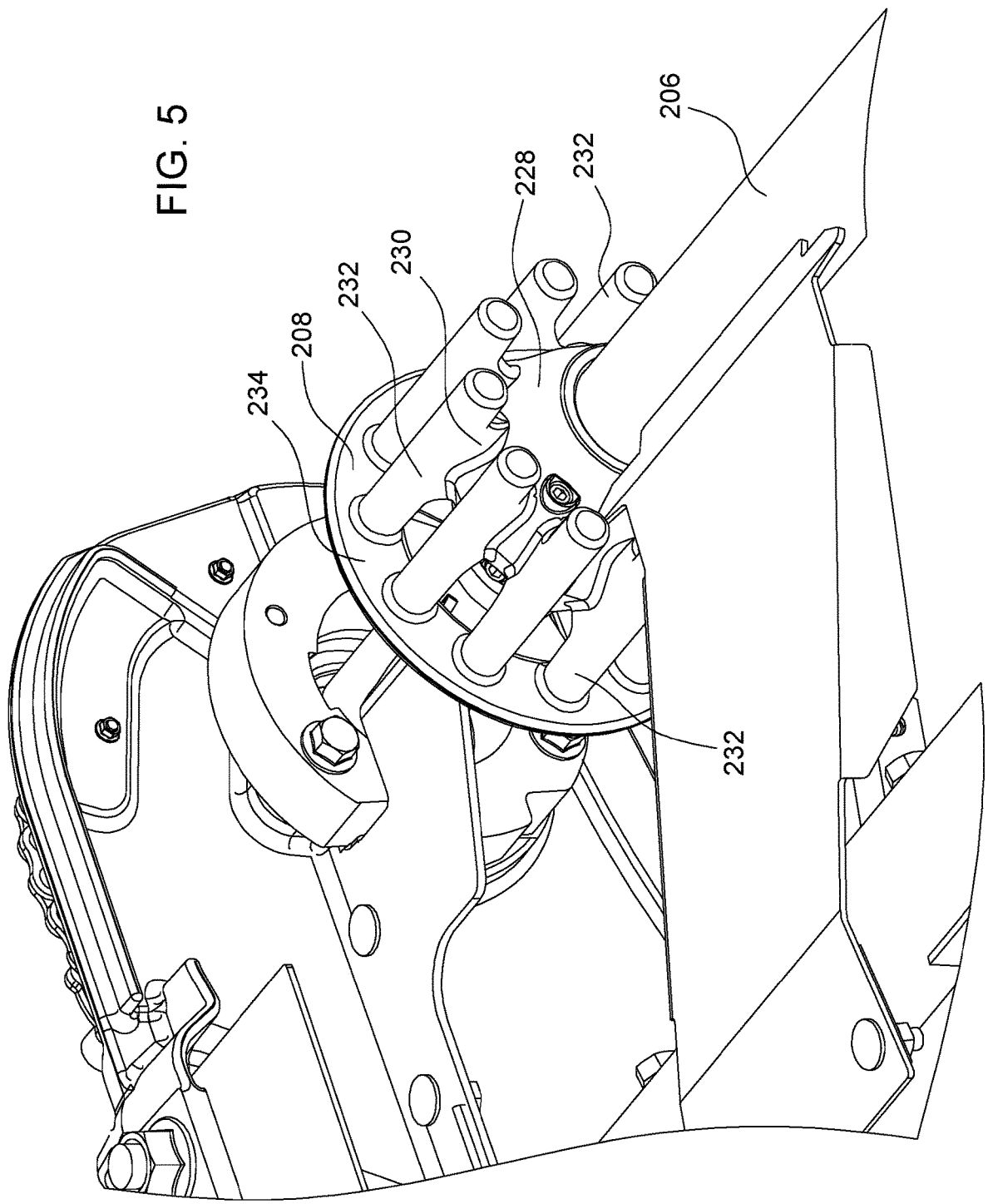
FIG. 5 is a perspective view of the cogged drive wheel of the foregoing figures.
Figure 6:
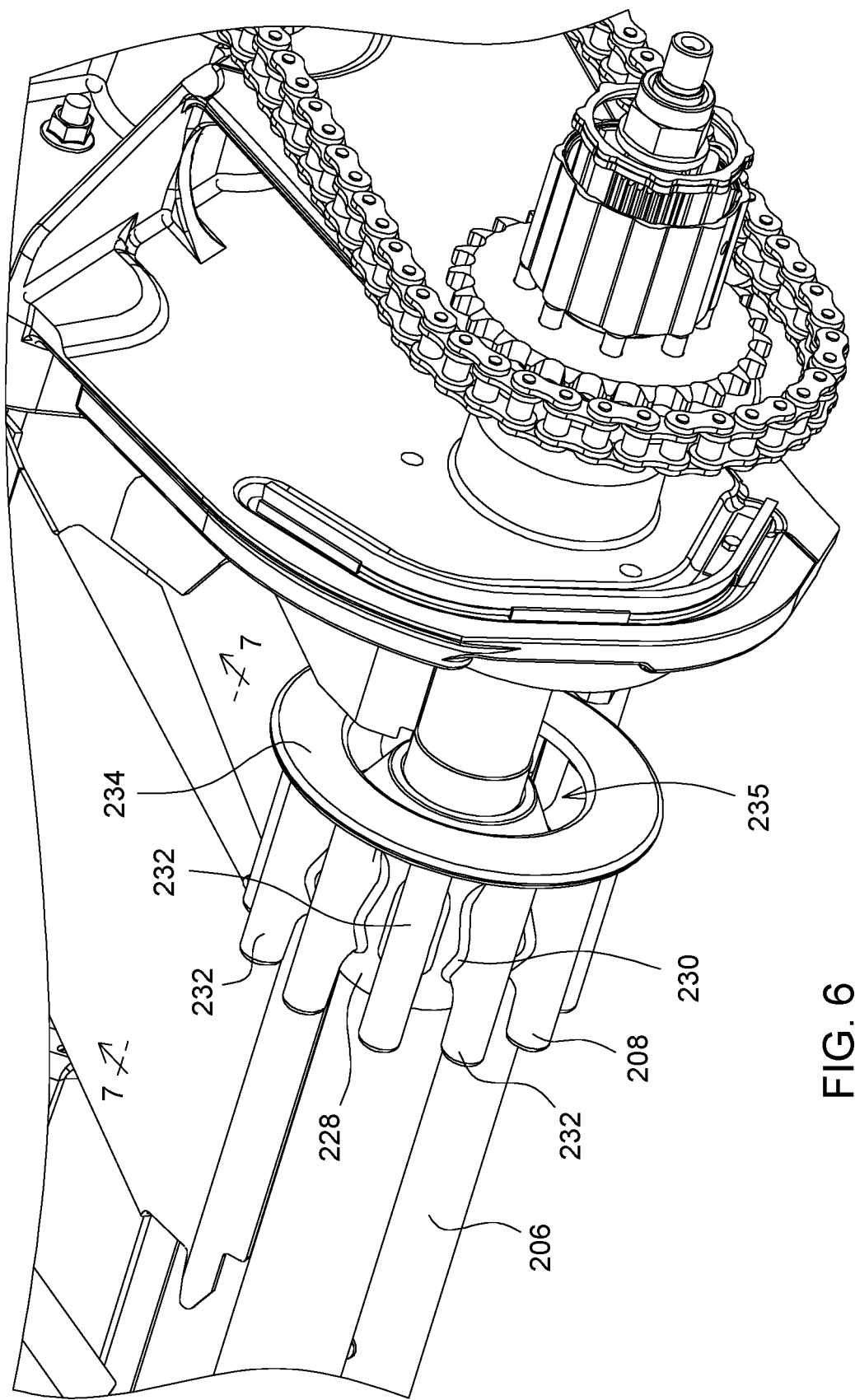
FIG. 6 is a reverse perspective view of the cogged drive wheel of FIG. 5.
Figure 7:
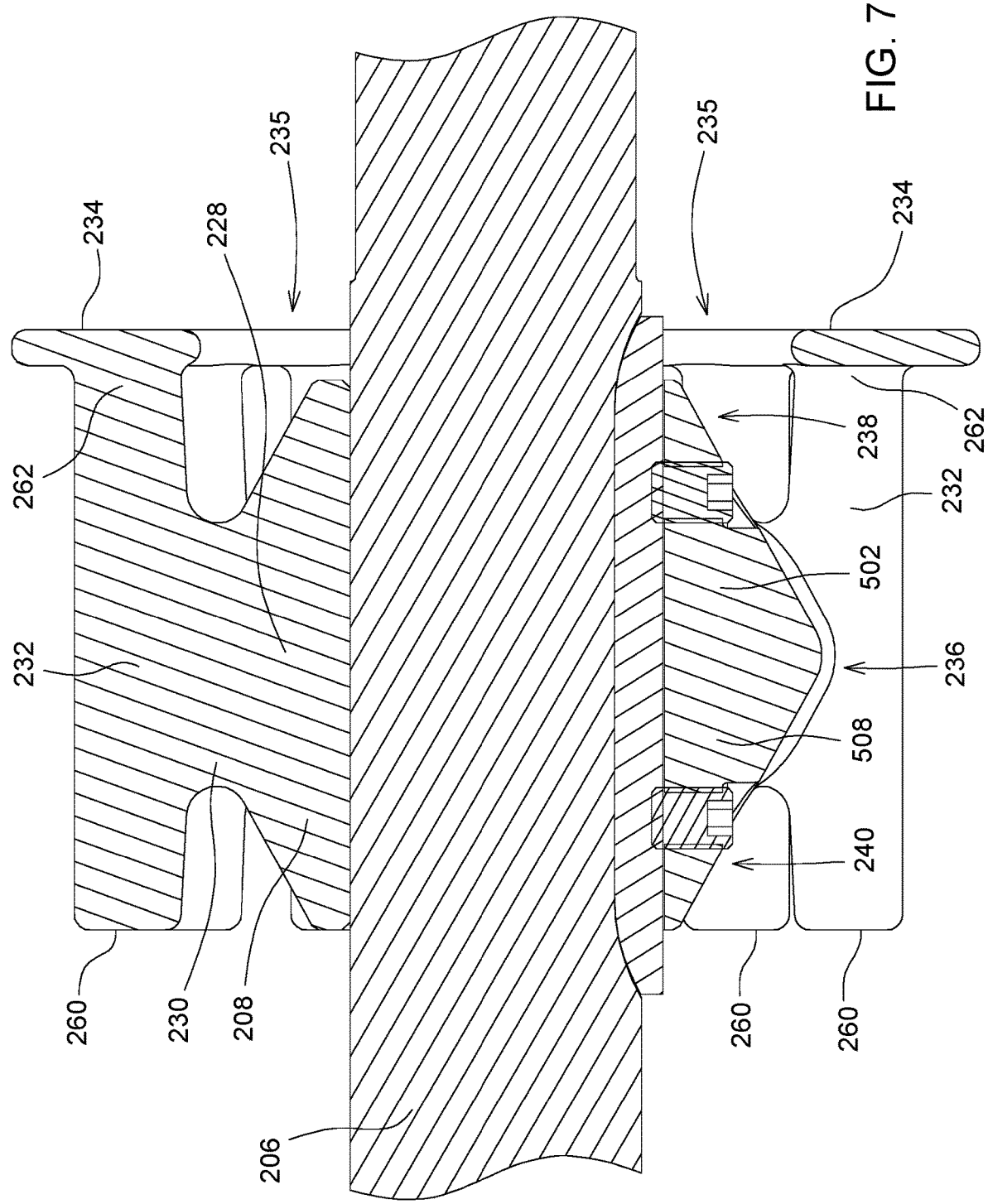
FIG. 7 is a cross-sectional view of the cogged drive wheel of FIGS. 5-6.
Figure 8:
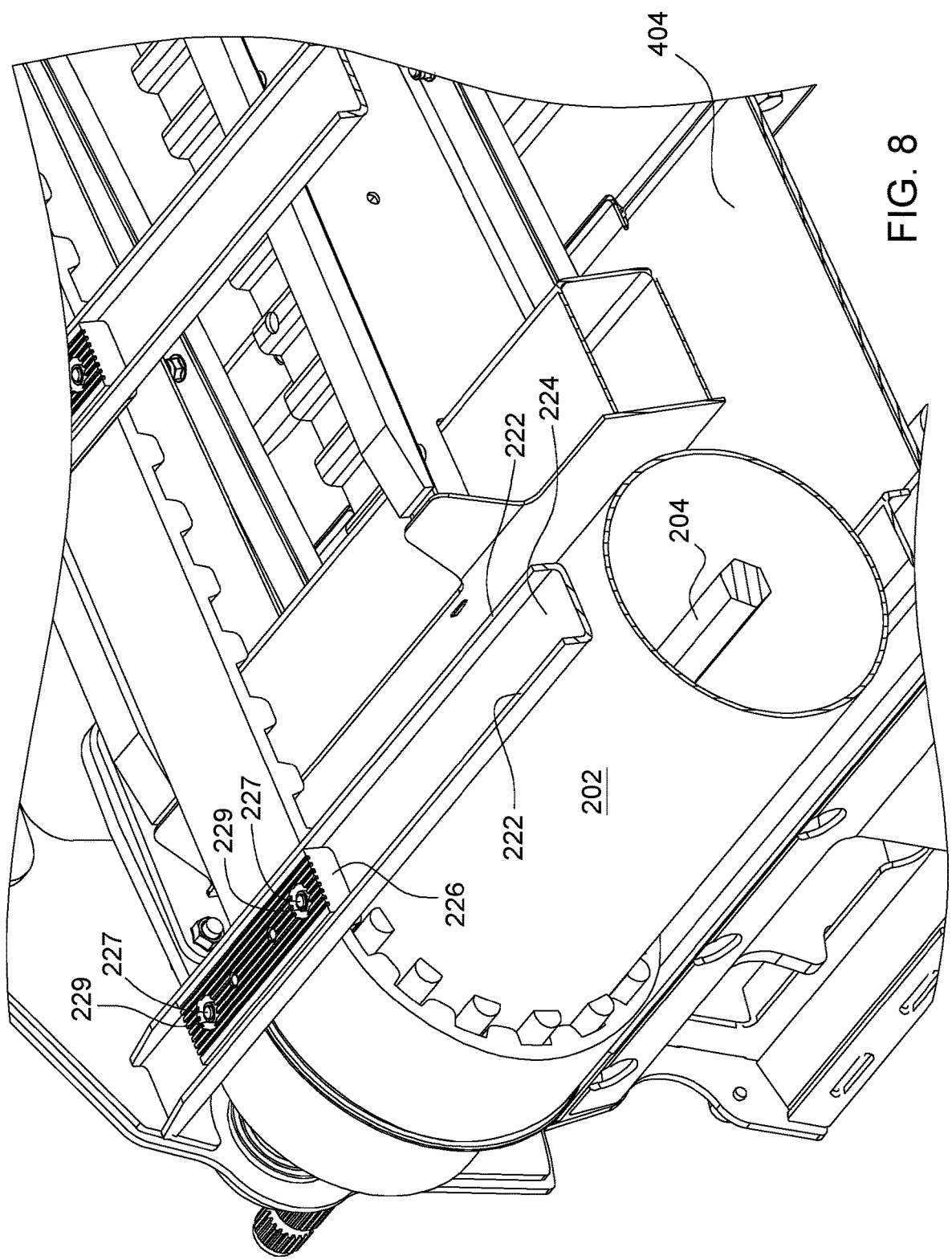
FIG. 8 is a detail view of the cogged drum of FIG. 4 including the endless belt and a conveyor slat.
Figure 9:
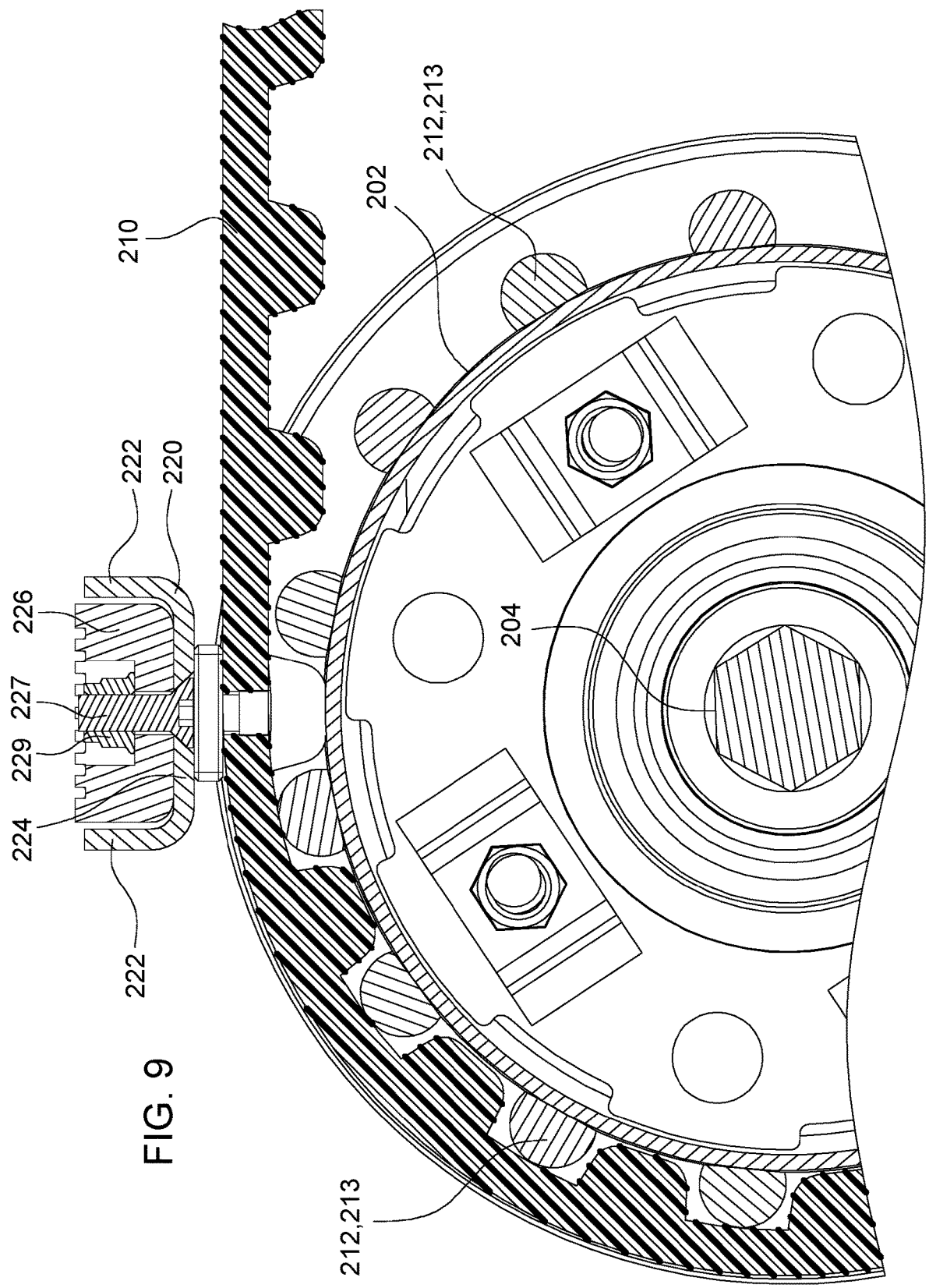
FIG. 9 is a cross-sectional side view of the cogged drum, belt, and conveyor slat of FIG. 8.
Figure 10:
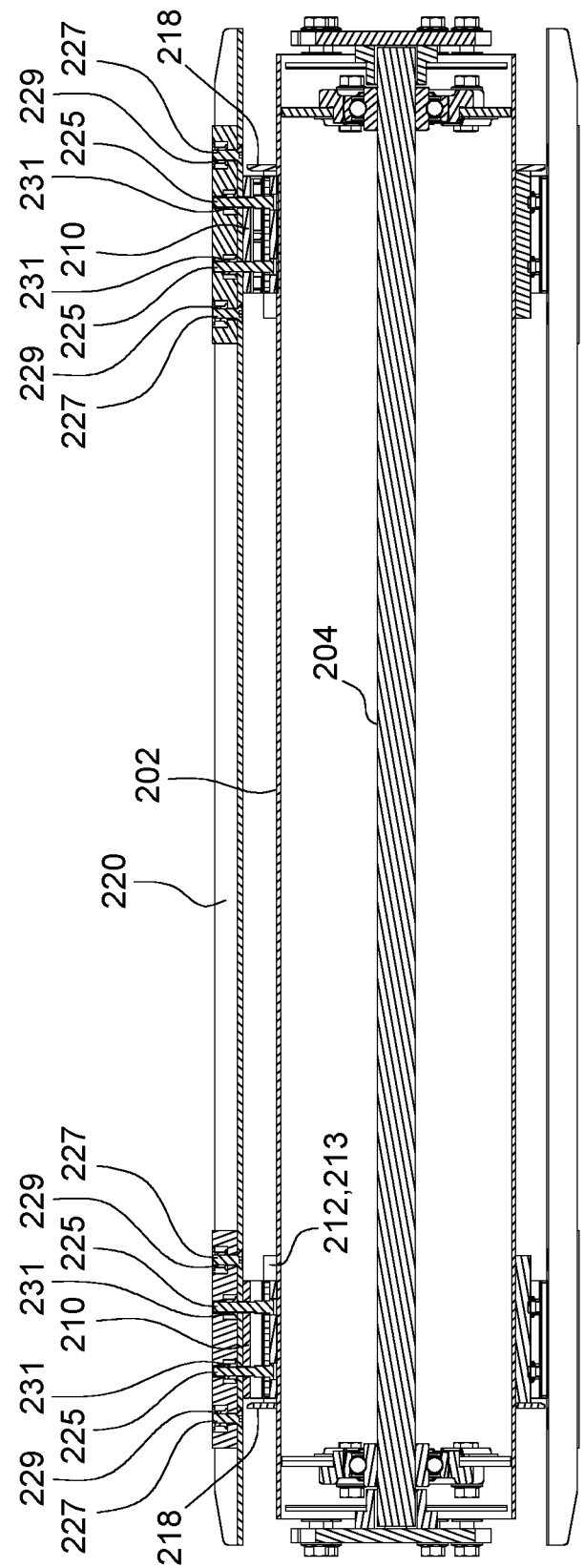
FIG. 10 is a cross-sectional view of the cogged drum, belt, and conveyor slat.

In FIGS. 2-3, the right side of the feederhouse 104 is shown. The remaining FIGS. 4-10 show features of the right side of the feederhouse 104. The left side is constructed identically but in mirror image fashion about the vertical and longitudinal cutting plane of section 2-2 (FIG. 1).

In this description, the directional terms "inner" or "inward" etc. refer to structures that face toward or are closer to the cutting plane. The directional terms "outer" or "outward" etc. refer to structures that face away from or are farther from the cutting plane.

The feederhouse 104 is in the form of a generally rectangular box with two open and opposing ends. The box has a top wall 400, two sidewalls 402, and a floor 404. An endless belt conveyor 200 is supported inside the feederhouse 104 and is mounted on the sidewalls of the feederhouse 104.

The endless belt conveyor 200 comprises a cogged drum 202 located at the front opening 120 of the feederhouse 104. The drum 202 is supported on a laterally extending shaft 204. The endless belt conveyor 200 also comprises a driveshaft 206 at the rear opening 122 upon which two cogged drive wheels 208 are mounted and fixed. The belt conveyor 200 also comprises two endless belts 210 that extend between the cogged drum 202 and the cogged drive wheels 208.

A motor (not shown) drives the shaft 206 in rotation, which drives the two cogged drive wheels 208, which in turn respectively drive the two endless belts 210, which in turn drive the cogged drum 202.

Two rings 212 of cogs 213 are fixed (typically welded) to the outer surface of the cogged drum 202 and extend radially outward therefrom. The cogs 213 on the drum engage with corresponding laterally extending recesses 214 on the inside of the two endless belts 210. The recesses 214 are defined between adjacent cogs 216 that extend inwardly from an inner surface of the two endless belts 210.

The endless belts 210 are formed of an elastomer impregnated fabric. Each belt 210 has a smooth outer surface and a cogged inner surface. The inner surface is defined by the cogs 216 that are spaced apart by the recesses 214.

Two retaining rings 218 are fixed to and extend outward from the outer surface of the cogged drum 202. One retaining ring 218 is disposed just outside of and adjacent to one ring 212 of cogs on the drum 202, and the other retaining ring 218 is disposed just outside of and adjacent to the other ring 212 of cogs on the drum 202 (see e.g. FIG. 10). The two retaining rings 218 keep the endless belts 210 from shifting their position from side to side on the drum 202.

The two endless belts 210 are fixed to opposing ends of several slats 220. The slats 220 are perpendicular to the direction of travel of the belts and are generally parallel to the rotational axes of the drum 202 and the wheels. The slats 220 engage the top of the crop mat and pull it upward from above through the feederhouse 104. The slats 220 are U-shaped in cross-section, having two outwardly extending flanges 222 and a floor 224. The outer edges of the flanges 222 engage the crop mat across substantially the entire length of the flanges 222. The floor 224 is fixed to the belts at opposing ends of slat 220.

Each slat 220 joins the two belts together, holds the belts to which it is attached in a predetermined rotational position and holds the belts a predetermined distance apart.

The belts and slats 220 can therefore only translate side to side (i.e. in a direction parallel to the length of the drum) as a unit. For this reason, only two retainers (here shown as two retaining rings 218) are used on the drum 202 to keep the entire belt/slat assembly centered in both directions. One retaining ring 218 is located on one side of the belt/slat assembly to abut one belt 210 in a first direction, and the other retaining ring 218 is located on the other side of the belt/slat assembly to abut the other belt 210.

The same centering function can be provided by locating the two retaining rings 218 to abut both sides of a belt 210. Alternatively the two retaining rings 218 can also be fixed to the drum between the two belts with one retaining ring abutting one belt 210 in a first axial direction and the other retaining ring abutting the other belt 210 in a second, opposing axial direction.

While continuous, circular, retaining rings 218 are preferred as retainers, other forms of retainers can be used, such as pins, brackets, or flanges that are spaced apart and distributed in a ring-like arrangement around the drum 202 in place of the retaining rings 218 and that extend axially outward from the surface of the drum 202. In this manner, gaps can be provided between the pins, brackets, or flanges that permit cut crop material to escape from between the belts and the drum 202.

The drum 202 is hollow and has a generally constant wall thickness and outside diameter over its length. The cogs 213 and the retainers 218 are preferably fixed to a section of the drum having the same diameter. Thus, the distance from the longitudinal and rotational axis of the drum to the bottom of the cogs 213 and the distance from the longitudinal and rotational axis of the drum to the bottom of the ring are the same. The cogs 213 are semicircular and are at least three times as long as they are wide, and preferably at least four times as long.

Wear Strips

One problem with the belt 210 and slat 220 arrangement is that the slats 220 can bang and wear against the floor of the feederhouse 104 when the crop mat is thin or absent. This produces noise and excessive wear.

To help prevent this noise and wear, wear strips 226 are fixed to each slat 220. These wear strips 226 are typically made of a softer material than the floor of the feederhouse 104, such as a thermoplastic material. The thermoplastic material is preferably nylon, polypropylene, polyethylene, or other high molecular weight thermoplast.

The wear strips 226 extend radially outward away from the tips of the flanges 222. Thus, when a slat 220 is dragged along the floor of the feederhouse 104, the wear strips 226 are in contact with the floor of the feederhouse 104 and hold at least a portion (but preferably all) of the slats 220 away from the floor of the feederhouse 104.

The wear strips 226 are short and are spaced apart along each slat 220. They are long enough to hold the slats 220 away from the floor the feederhouse 104, but not so long that they fill the gap between each slat 220 over the length of the slat 220. If they did extend the entire length of the slat 220, they would prevent the outer edges of the flanges of the slats 220 from properly gripping the top surface of the crop mat. On the other hand, if wear strips 226 are too short, they will wear rapidly and require too-frequent replacement.

The preferred arrangement, as shown here, is to provide two short wear strips 226, one mounted on each end of the slat 220, while leaving the majority of the length of the slat 220 free to engage the top of the crop mat.

The wear strips 226 can be attached at any point or points along the length of each slat 220 to reduce wear and noise. For reasons of cost and efficient manufacture, however, the wear strips 226 are preferably attached to the slats 220 where the slats 220 are attached to the belts 210. Thus, when the feederhouse 104 is assembled, the assembler can simultaneously attach the slat 220 to the belt 210, and attach the wear strips 226 to the slat 220.

The wear strips 226 can be attached permanently or removably to the slats 220. If they are attached permanently, however, the entire belt/slat assembly will need to be removed and replaced and/or remanufactured. For reasons of cost and efficient maintenance, however, the wear strips 226 are preferably removably attached to the slats 220 such that they can be removed and replaced without having to remove the slats 220 from the belt 210.

Each wear strip 226 is generally rectangular. It is inserted into the elongate gap between adjacent flanges 222 of a slat 220. It fills substantially the entire gap between the two flanges 222. The wear strip 226 has two holes into which two threaded fasteners 227 extend. The threaded fasteners 227 extend upward from the floor 224 of the slat 220. The threaded fasteners 227 may be fixed permanently to the floor 224 of the slat 220. Alternatively (and as shown in the figures), the threaded fasteners 227 may have a head and be inserted through a hole in the floor 224. In this headed-fastener arrangement, the holes in the floor 224 are preferably disposed adjacent to and to either side of the belt 210. In this manner, both the wear strips 226 and the headed-fastener can both be efficiently replaced without loosening or removing the slats 220 from the belt 210.

A nut 229 is threaded onto the free end of each threaded fastener and is seated to an abutting surface of the hole. This abutting surface may be on top the hole or located in a recess in the hole (as illustrated herein). A recess providing an abutting shoulder in the hole is preferred so that the outer, free end of the threaded fastener and the nut 229 are located below the outer surface of the wear strip so they are not damaged when the wear strip drags along the floor of the feederhouse 104.

Each wear strip 226 also has two clearance holes formed in its bottom surface (i.e. the surface abutting the floor 224 of the slat 220) to provide clearance space for two slat fasteners 225 that attach the slat 220 to the belts. In the arrangement shown herein, the slat fasteners 225 are threaded fasteners, preferably bolt/nut assemblies. The slat fasteners 225 extend upward through a short reinforcing bar located below the belt 210, then through the belt 210, then through a spacer bar, then through the floor 224 of the slat 220.

A nut 231 is fixed to the free end of the slat fasteners 225 thus securing the slat 220 to the belt 210. In the arrangement shown herein, the slat fasteners 225 and the nut 231 do not engage the walls of the clearance holes, and thus do not secure the wear strip 226 to the slat fasteners 225.

Alternatively, however, the clearance holes could be dimensioned such that the nut 231 was secured to an abutting surface in the clearance holes, and thus secure the wear strip 226 to both the slat 220 and to the belt 210. This arrangement, while more secure, would require more time to replace the wear strip 226.

In the arrangement shown herein, the clearance holes extend completely through the wear strip. In this manner, a slat 220 and its attached wear strips 226 can be removed (or attached) as an assembly by unscrewing and removing the nut 231 attached to the free end of the slat fastener 225. This permits efficient replacement of a slat/wear strip assembly as a single unit by the removal of only four fasteners.

By providing first fasteners to hold the wear strip to the slat 220, and providing second fasteners to hold the slat 220 to the belt 210, the wear strip can be removed from the slat 220 and replaced without removing the slat 220 from the belt 210 (a more complicated and time-consuming process). Alternatively, a single fastener (or fasteners) can be provided that simultaneously attaches both the wear strip to the slat 220 and the slat 220 to the belt 210. For example, one or more fasteners can be provided that extend through the belt 210, through the slat 220, and through the wear strip 226.

As another alternative, the fasteners need not be threaded fasteners, but can be rivets. As another alternative, the threaded fasteners and nuts that hold the wear strip 226 to the slat 220 can be reversed, such that the nuts are fixed to the underside of the slats.

Cogged Drive Wheels

Each endless belt 210 extends not only around the drum 202, but around a corresponding drive wheel 208. The two drive wheels 208 are disposed on and fixed to opposing ends of the driveshaft 206.

Each of the drive wheels 208 includes a hub 228 that extends about the driveshaft 206. The hub 228 has a through hole sized to receive the driveshaft 206 and to be fixed to the driveshaft 206. Several flanges 230 extend outward from the hub 228 and have cogs 232 at their outer ends to engage corresponding cogs and recesses 214 on the inner surface of the belt 210.

Each drive wheel 208 includes a retainer (here shown as retaining ring 234) that is fixed to and supported on the outward ends of the cogs 232. The retaining ring 234 is positioned to abut the outer edge of the web of the belt 210 and the outer ends of the cogs 216 on the belt 210 as the belt 210 passes over the drive wheel 208.

The portion of the hub 228 adjacent to the retaining ring 234 has a reduced diameter to provide an annular gap 235 between the retaining ring 234 and the hub 228 that extends completely around and between the hub 228 and the retaining ring 234. This annular gap 235 permits crop material to escape in an outward direction (i.e. from the drive wheel 208 toward its adjacent sidewall of the feederhouse) through the annular gap 235 without catching on another protrusion, rib, flange, or similar structure.

The hub 228 is generally cylindrical. It has a greater wall thickness at its midsection 236 than its wall thickness at its outer end 238 and at its inner end 240.

To achieve this change in wall thickness, the hub 228 is generally in the form of two conical sections 500, 502 fixed together at their larger ends.

The flanges 230 extend outward from the midsection 236 of the hub 228, and are fixed to the cogs 232 at the axial midpoint of the cogs 232. Each cog 232 is elongate with a first cantilevered free end 260 that extends inwardly and generally parallel to the rotational axis of the drive wheel 208, and (but for the retaining rings 218) a second cantilevered free end 262 that extends outwardly and generally parallel to the rotational axis of the drive wheel 208. The cogs 232, therefore, are supported on their associated flanges 230 at a central region of the cog 232 and extend outward in both directions from the central region, in a direction parallel to the rotational axis of the drive wheel 208.

The retaining rings 218 associated with each drive wheel 208 serve the same function as the retaining rings 218 on the drum 202. If the belt/slat assembly drifts in one direction, it abuts a first retaining ring, which prevents it from falling off the drive wheel 208. If the belt/slat assembly drifts in the other direction, it abuts the other retaining ring, which similarly prevents it from falling off the drive wheel 208 in the other direction. Since the two retaining rings abut the belt/slat assembly from opposite directions, they prevent the belt 210 from shifting in either direction.

The embodiments disclosed in this application explain at least one construction of the invention. Other constructions are possible. The invention itself is defined by the claims.

The invention claimed is:

1. A conveyor assembly for use with a feederhouse of an agricultural harvester, the conveyor comprising:
   an elongated drum configured to rotate around a first longitudinal axis, the elongated drum defining a constant first outer diameter over its length;
   a first plurality of cogs extending radially outwardly from the first outer diameter of the elongated drum;
   a driveshaft configured to rotate about a second longitudinal axis spaced a distance from the first longitudinal axis, the driveshaft defining a substantially constant second outer diameter over its length, and wherein the second outer diameter is less than the first outer diameter;
   a drive wheel disposed on and fixed to the driveshaft for rotation together therewith, wherein the drive wheel includes a second plurality of cogs and a retaining ring extending radially outwardly from the second plurality of cogs, and wherein the drive wheel defines an annular gap between the retaining ring and the drive shaft; and
   an endless belt extending around and operatively engaging at least a portion of the first plurality of cogs and at least a portion of the second plurality of cogs.

2. The conveyor assembly of claim 1, wherein the first plurality of cogs are configured to engage and be driven by mating cogs extending inwardly from the endless belt.

3. The conveyor assembly of claim 1, wherein the cogs of the first plurality of cogs are spaced equidistantly apart.

4. The conveyor assembly of claim 1, wherein each cog of the first plurality of cogs has a cog length in the direction of the first longitudinal axis that is greater than a cog width in a direction parallel to the direction of rotation of the drum.

5. The conveyor assembly of claim 4, wherein the cog length is at least three times as large as the cog width.

6. The conveyor assembly of claim 5, wherein the cog length is at least four times as large as the cog width.

7. The conveyor assembly of claim 1, wherein each cog of the first plurality of cogs are semicircular in a cross-section that is taken perpendicular to the first longitudinal axis.

8. The conveyor assembly of claim 1, wherein the height of each cog of the first plurality of cogs above the first outer diameter of the elongated drum is substantially the same as the height of a mating cog.

9. The conveyor assembly of claim 1, further comprising a belt retainer disposed on the elongated drum to abut one side of the endless belt.

10. The conveyor assembly of claim 1, wherein the elongated drum is supported on a laterally extending shaft.

11. The conveyor assembly of claim 10, wherein the laterally extending shaft defines an outer diameter that is less than the first outer diameter.

12. The conveyor assembly of claim 1, further comprising:
    a plurality of slats coupled to the endless belt; and
    a first wear strip coupled to each slat of the plurality of slats, wherein the first wear strip extends away from the endless belt;
    a second wear strip coupled to each slat of the plurality of slats, wherein the second wear strip extends away from the endless belt, and wherein the second wear strip is spaced a distance from the first wear strip to form a gap therebetween.

13. The conveyor assembly of claim 12, wherein each slat of the plurality of slats has a first end and a second end opposite the first end, wherein the first wear strip is coupled to each slat proximate the first end, and wherein the second wear strip is coupled to each slat proximate the second end.

14. The conveyor assembly of claim 12, wherein each slat of the plurality of slats is substantially U-shaped in cross-section having two flanges extending away from the first and second endless belts.

* * * * *